(12) United States Patent
Das et al.

(10) Patent No.: US 10,984,046 B2
(45) Date of Patent: Apr. 20, 2021

(54) GRAPH DATABASE AND RELATIONAL DATABASE MAPPING

(71) Applicant: ENTIT Software LLC, Sunnyvale, CA (US)

(72) Inventors: Mahashweta Das, Palo Alto, CA (US); Alkiviadis Simitsis, Palo Alto, CA (US); William K. Wilkinson, Palo Alto, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 387 days.

(21) Appl. No.: 15/758,825

(22) PCT Filed: Sep. 11, 2015

(86) PCT No.: PCT/US2015/049668
§ 371 (c)(1),
(2) Date: Mar. 9, 2018

(87) PCT Pub. No.: WO2017/044119
PCT Pub. Date: Mar. 16, 2017

(65) Prior Publication Data
US 2020/0201909 A1    Jun. 25, 2020

(51) Int. Cl.
*G06F 16/901* (2019.01)
*G06F 16/245* (2019.01)
*G06F 16/28* (2019.01)

(52) U.S. Cl.
CPC ........ *G06F 16/9024* (2019.01); *G06F 16/245* (2019.01); *G06F 16/284* (2019.01)

(58) Field of Classification Search
CPC .. G06F 16/284; G06F 16/9024; G06F 16/258; G06F 16/84; G06F 16/245; G06F 16/25
(Continued)

(56) References Cited

U.S. PATENT DOCUMENTS 5,832,498 A * 11/1998 Exertier ............... G06F 16/289
707/999.103
7,219,102 B2 * 5/2007 Zhou ..................... G06F 16/284
707/792

(Continued)

OTHER PUBLICATIONS

International Search Report and Written Opinion; PCT/US2015/049668; dated Jul. 11, 2016; 14 pages.
(Continued)

*Primary Examiner* — Phong H Nguyen

(57) ABSTRACT

Examples for mapping a relational database to a graph database include a mapping engine to execute an arbitrary query on a relational database, identify a result column tag based on a tag of an underlying base table, process the result column into a typed, directed property graph based on the result column tag, and output the typed, directed property graph to a graph database. Examples for mapping a graph database to a relational database include processing a graph transaction by updating a mapping layer with a surrogate describing a change to a database object, determining, for an object in the mapping layer, if a database constraint defined on the object is satisfied, collecting database changes defined by the surrogate into a database change request, submitting the change request to a relational database as a transaction, and deleting the surrogate for the object in the mapping layer.

11 Claims, 5 Drawing Sheets

(58) Field of Classification Search
USPC ................................................. 707/797, 798
See application file for complete search history.

(56) References Cited

U.S. PATENT DOCUMENTS

| | | | |
|---|---|---|---|
| 7,467,125 B2 | 12/2008 | Khatchatrian | |
| 7,493,335 B2* | 2/2009 | Gold | G06F 16/252 707/999.002 |
| 9,053,210 B2 | 6/2015 | Einikety et al. | |
| 2006/0004851 A1* | 1/2006 | Gold | G06F 16/252 707/999.103 |
| 2006/0173865 A1* | 8/2006 | Fong | G06F 40/151 707/999.1 |
| 2007/0022103 A1* | 1/2007 | Rys | G06F 16/258 707/999.003 |
| 2007/0299812 A1 | 12/2007 | Salch | |
| 2008/0133608 A1 | 6/2008 | Brown et al. | |
| 2009/0248719 A1* | 10/2009 | Hughes | G06F 16/245 707/999.1 |
| 2010/0095299 A1 | 4/2010 | Gupta et al. | |
| 2011/0093486 A1* | 4/2011 | Lin | G06F 16/2448 707/760 |
| 2011/0153662 A1 | 6/2011 | Stanfill et al. | |
| 2012/0096043 A1 | 4/2012 | Stevens | |
| 2012/0158771 A1* | 6/2012 | Jackson | G06F 16/2477 707/769 |
| 2012/0278365 A1 | 11/2012 | Labat et al. | |
| 2013/0246049 A1* | 9/2013 | Mirhaji | G06F 40/253 704/9 |
| 2013/0339385 A1 | 12/2013 | Abrams | |
| 2014/0019490 A1 | 1/2014 | Roy et al. | |
| 2014/0136553 A1 | 5/2014 | Jacob et al. | |
| 2014/0201234 A1* | 7/2014 | Lee | G06F 16/24534 707/769 |
| 2014/0229496 A1* | 8/2014 | Minami | G06F 16/9024 707/756 |
| 2015/0026158 A1 | 1/2015 | Jin | |
| 2015/0074041 A1 | 3/2015 | Bhattacharjee | |
| 2015/0081739 A1 | 3/2015 | Xu | |
| 2015/0081741 A1 | 3/2015 | Xu | |
| 2015/0120775 A1* | 4/2015 | Shao | G06F 16/2456 707/769 |
| 2015/0227582 A1 | 8/2015 | Gu | |
| 2015/0347421 A1* | 12/2015 | Steiner | G06F 16/282 707/798 |
| 2017/0053294 A1* | 2/2017 | Yang | G06F 16/9024 |
| 2018/0246987 A1 | 8/2018 | Das | |

OTHER PUBLICATIONS

Ramanumjam, S. et al.; "Bi-directional Translation of Relational Data Into Virtual RDF Stores"; May 2010; 14 pages.
Alessandro Morari et al., "GEMS: Graph database Engine for Multithreaded Systems", Big Data—Algorithms, Analytics, and Applications 2015, 6 pages.
Bachman, M.; "Graphaware: Towards Online Analytical Processing in Graph Databases"; Sep. 2013; 149 pages.
Bin Shao et al., "Trinity: a distributed graph engine on a memory cloud", SIGMOD'13, Jun. 22-27, 2013, pp. 505-516.
Da Zheng et al., "FlashGraph: Processing Billion-Node Graphs on an Array of Commodity SSDs" FAST'15, Feb. 16-19, 2015, 15 pages.
David Simmen et al., "Large-Scale Graph Analytics in Aster 6: Bringing Context to Big Data Discovery", Proceedings of the VLDB Endowment, vol. 7, No. 13, 2014, pp. 1405-1416.
Jindal, et al ; Vertexica: Your Relational Friend for Graph Analyticsl; CSAIL, MIT, University of Maryland; Aug. 2014; 5 pages.
PCT International Search Report issued in Appl. No. PCT/US2015/048562; dated May 31, 2016; 3 pages.
Weaver Systems, "Weaver alpha", Feb. 19, 2015, 8 pages. <https://web.archive.org/web/20150219202053/http://weaver.systems/.
Xue, J., et al; "Seraph: An Efficient, Low-cost System for Concurrent Graph Processing"; Jun. 23-27, 2014; 12 pages.

* cited by examiner

GRAPH DATABASE AND RELATIONAL DATABASE MAPPING

BACKGROUND

Computing systems, devices, and electronic components may access, store, process, or communicate with a database or databases. A database may store data or information in various formats, models, structures, or systems, such as in a relational database system or a graph database structure. Users or processes may access or query the databases to fetch or retrieve data in a database, or to transfer or otherwise share information between varying database systems, such as between relational databases and graph database structures.

BRIEF DESCRIPTION OF THE DRAWINGS

The following detailed description references the drawings, wherein.

DETAILED DESCRIPTION

Various examples described below provide for mapping a relational database to a graph database and/or mapping a graph database to a relational database. In an example of mapping a relational database to a graph database, a mapping engine may execute an arbitrary query on a relational database, identify a result column tag based on a tag of an underlying base table, process the result column into a typed, directed property graph based on the result column tag, and output the typed, directed property graph to a graph database.

In an example of mapping a graph database to a relational database, a graph transaction may be processed by updating a mapping layer with a surrogate describing a change to a database object. For an object in the mapping layer, a determination may be made if a database constraint defined on the object is satisfied. Database changes defined by the surrogate may be collected into a database change request, the change request may be submitted to a relational database as a transaction, and the surrogate for the object in the mapping layer may be deleted.

As the amount of information stored on computing devices has continued to expand, companies, organizations, and information technology departments have adopted new technologies to accommodate the increased size and complexity of data sets, often referred to as big data. Traditional data processing or database storage systems and techniques such as relational databases or relational database management systems ("RDBMS"), which rely on a relational model and/or a rigid schema, may not be ideal for scaling to big data sets. Similarly, such databases may not be ideal or optimized for handling certain data, such as associative data sets.

Organizations may employ a graph database to collect, store, query, and/or analyze all or a subset of the organization's data, and in particular large data sets. A graph database may be employed within an organization alone, in combination with other graph databases, or in combination with relational databases or other types of databases. In some examples, a graph database may provide applications with a more natural view of object classes and relationships, and may allow for easier expression of computation.

However, as organizations may store much of their data in relational database or structured formats, organizations may be faced with the challenge of copying and/or converting data from a relational database to a graph database. In some examples, organizations may also wish to copy or convert data from a graph database to a relational database, or to propagate data back and forth such that data from a relational database can be manipulated in a graph database and then propagated back to the relational database. In either case, the complexity of copying or converting data between the two different database systems and/or structures may be heightened even further.

Figure 1:
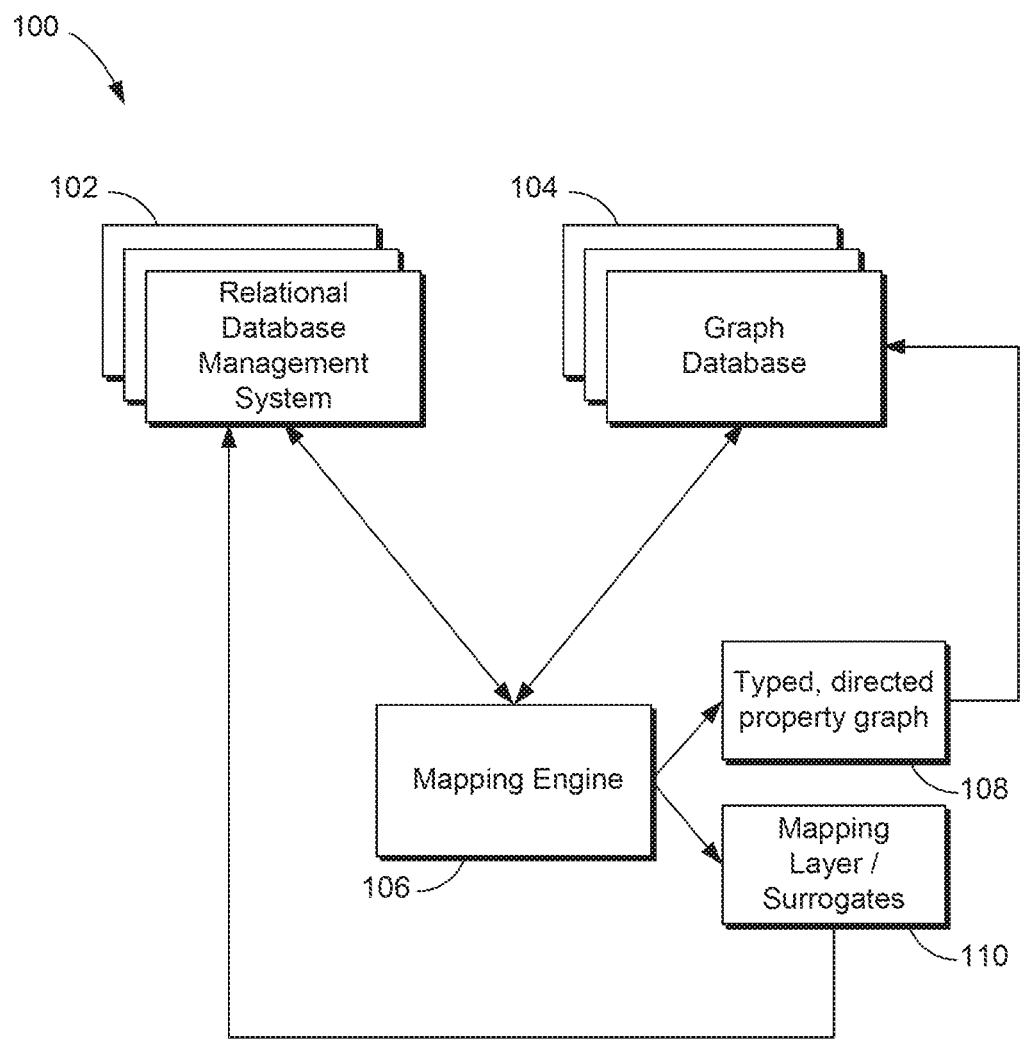
FIG. 1 is a block diagram of a system to map data between a relational database and a graph database, according to an example.

FIG. 1 is a block diagram of a system to map data between a relational database and a graph database, according to an example. FIG. 1 may be referred to as database environment 100.

In the example of FIG. 1, a database environment 100 may comprise a relational database management system or RDBMS 102 and a graph database 104. The relational database 102 may be any database type that employs a relational model, e.g., a collection of tables with each table comprising rows and columns, with a unique key for each row. The graph database 104 may be any database type that employs graph structures to store data using, for example, edges, vertices, and/or properties to represent and/or store data. In one example, a graph may be a typed, directed property graph, e.g., a graph comprising vertices and directed edges where properties (key-value pairs) may be associated with a vertex or an edge and where a vertex may be assigned one or more labels or types. In other examples, a graph may be, e.g., a bipartite graph, a simple undirected graph, or other graph.

In some examples, both a graph database and a relational database may have a common conceptual model. Otherwise, there may be no correspondence between the two databases and no reason to map between the two databases. In an example, a conceptual model may comprise object classes and relationships among classes. An object class may be typed (e.g., Person, Order) and a relationship may link classes (e.g., fatherOf, ShipTo). Classes and relationships may have associated properties (e.g., Age, shipDate). Given this model, tables, rows, columns, vertices, edges and properties may model some aspect of the underlying conceptual model.

RDBMS 102 and graph database 104 may be coupled to or communicate with a mapping engine 106. Mapping engine 106 may allow for the copy or conversion of data between a RDBMS and a graph database in either direction. For example, mapping engine 106 may allow data stored in a relational model, e.g., in tables, columns, and/or rows, to be converted into a graph structure, e.g., as edges, vertices, and/or properties. Similarly, mapping engine 106 may allow data stored in a graph structure, e.g., as edges, vertices, and/or properties to be converted into a relational model, e.g., in tables, columns, and/or rows.

During the conversion process, the methods described herein may export a typed, directed property graph 108 when converting from a relational database to a graph database, or may export a mapping layer describing surrogate objects for classes and relationships when converting from a graph database to a relational database. Typed, directed property graph 108 may support, for example, n-ary relationships and properties of relationships that may not be expressed in other models, such as the Resource Description Framework ("RDF").

RDBMS 102, graph database 104, and/or mapping engine 106 may reside in a data center, cloud service, or virtualized server infrastructure (hereinafter "data center"), which may refer to a collection of servers and other computing devices that may be on-site, off-site, private, public, co-located, or located across a geographic area or areas. A data center may comprise or communicate with computing devices such as servers, blade enclosures, workstations, desktop computers, laptops or notebook computers, point of sale devices, tablet computers, mobile phones, smart devices, or any other processing device or equipment including a processing resource. In examples described herein, a processing resource may include, for example, one processor or multiple processors included in a single computing device or distributed across multiple computing devices.

In the example of FIG. 1, RDBMS 102, graph database 104, and/or mapping engine 106 may reside on a computing device that includes a processing resource and a machine-readable storage medium comprising or encoded with instructions executable by the processing resource, as discussed below in more detail with respect to FIGS. 2-5. In some examples, the instructions may be implemented as engines or circuitry comprising any combination of hardware and programming to implement the functionalities of the engines or circuitry, as described below.

Database environment 100 may also comprise a synchronization engine (not shown) to extract updates from a graph database and aggregate the updates as relational database transactions. Database environment 100 may also include external connectors, which may be connectors to external systems, processes, or databases, such as a connector to a relational database, legacy system, or other system for ingesting data or exporting data.

In the example of FIG. 1, RDBMS 102, graph database 104, and/or mapping engine 106 may be directly coupled or communicate directly, or may communicate over a network. A network may be a local network, virtual network, private network, public network, or other wired or wireless communications network accessible by a user or users, servers, or other components. As used herein, a network or computer network may include, for example, a local area network (LAN), a wireless local area network (WLAN), a virtual private network (VPN), the Internet, a cellular network, or a combination thereof.

Figure 2:
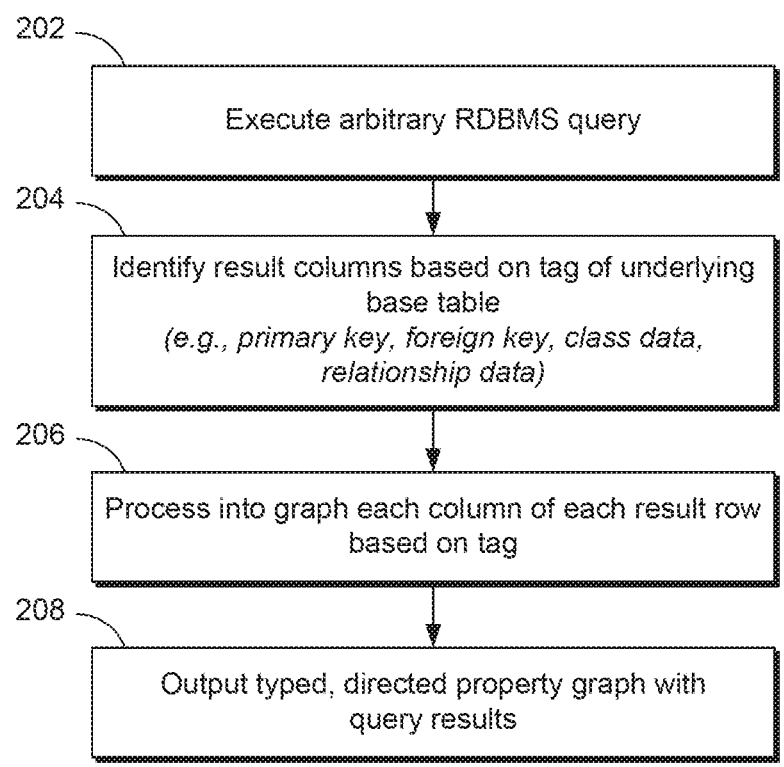
FIG. 2 is a flowchart of mapping a relational database to a graph database, according to an example.

FIG. 2 is a flowchart of mapping a relational database to a graph database, according to an example.

In block 200, in an example, an arbitrary RDBMS query is executed. The query may be received from, e.g., an application, process, tool, script, or other engine for purposes of communicating with a relational database, such as RDBMS 102.

The query may be executed on a RDBMS with an arbitrary database schema, where each table comprises either descriptive data for one object type, e.g., a class table, or relationship data that links two objects types, e.g., a relationship table. In such examples, each row in a class table may have data for one class object, and each row in a relationship table may have data for one relationship instance.

In block 204, in an example, each column resulting from the query is identified based on the tag of the underlying base table, e.g., the relational database. For example, the column may be identified as containing or describing a primary key (e.g., a unique identifier for a row), a foreign key (e.g., a column that references another table), class data, relationship data, derived data, or other types of data. Identifying the provenance of a result column may be accomplished by, for example, parsing an execution tree of operators and working down the tree from the result, e.g., the tree root, to find the source operand(s) that correspond to each result column.

In some examples, block 204 may further comprise identifying whether a column is derived class data or derived relationship data depending on whether the computation is a function of a single class table. Derived data may be, for example, a functional expression or computation over source data, e.g., "price*1.5" or "avg(price)". Some expressions may have a unique inverse, e.g., "price*1.5" while other expressions may not be invertible, e.g., "avg(price)". In some examples, block 204 may also comprise identifying a primary key column corresponding to class data, identifying a corresponding primary key for a foreign key, and/or identifying a primary key and foreign key for relationship data.

In block 206, each result column or each result row may be processed based on a tag. In some examples, processing the result column comprises processing the data into a typed, directed property graph as shown in FIG. 1. Processing each column of each result row is described in more detail with respect to FIG. 3, described below.

In block 208, the typed, directed property graph with query results may be output, e.g., from mapping engine 106 to graph database 104 or other output.

Figure 3:
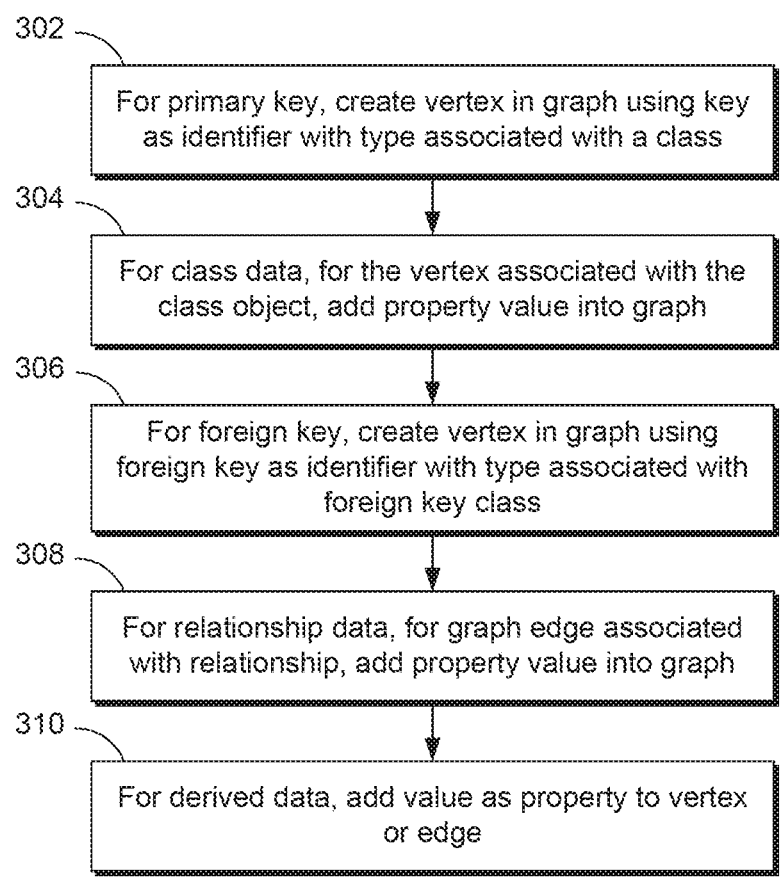
FIG. 3 is a flowchart of processing columns from a relational database for mapping to a graph database, according to an example.

FIG. 3 is a flowchart of processing columns from a relational database for mapping to a graph database, according to an example. In the flow of FIG. 3, each result column or each result row identified in FIG. 2 may be processed, e.g., into a typed, directed property graph as shown in FIG. 1. The query result may create a new graph, or may add to an existing graph.

In block 302, in the event that a column comprises or describes a primary key, a vertex in a graph may be created using the primary key as the vertex identifier with the type associated with the class of the underlying table, e.g., a person, product, vendor, etc. in a table of the relational database.

In block 304, in the event that a column comprises or describes class data, a property value may be added to the graph for the vertex associated with the class object. In some examples, block 304 may be based on identification of the vertex for the data, e.g., if the result set includes a column containing the primary key for the table that is the source of the class data.

In block 306, in the event that a column comprises or describes a foreign key, a vertex may be created in the graph using the foreign key as the vertex identifier and with the type associated with a foreign key class. In some examples, a graph edge may be created from the vertex the edge associated with the primary key to the vertex associated with the foreign key. In such examples, the edge may be labeled with the relationship.

In block 308, in the event that a column comprises or describes relationship data, a property value may be added to the edge associated with the relationship. In some examples, block 308 may be based on identification of the objects linked by the relationship, i.e., the result may include columns containing the keys that identify the vertices in the relationship.

In block 310, in the event that a column comprises or describes derived data, the value may be added as a property to either a vertex or an edge of the graph. In some examples, block 310 may further comprise determining if there is a unique inverse computation.

In some examples, a class associated with a key or a label associated with an edge may not be unique, e.g., a mapping may be ambiguous. In such examples, metadata from other columns may be referenced for disambiguation.

Figure 4:
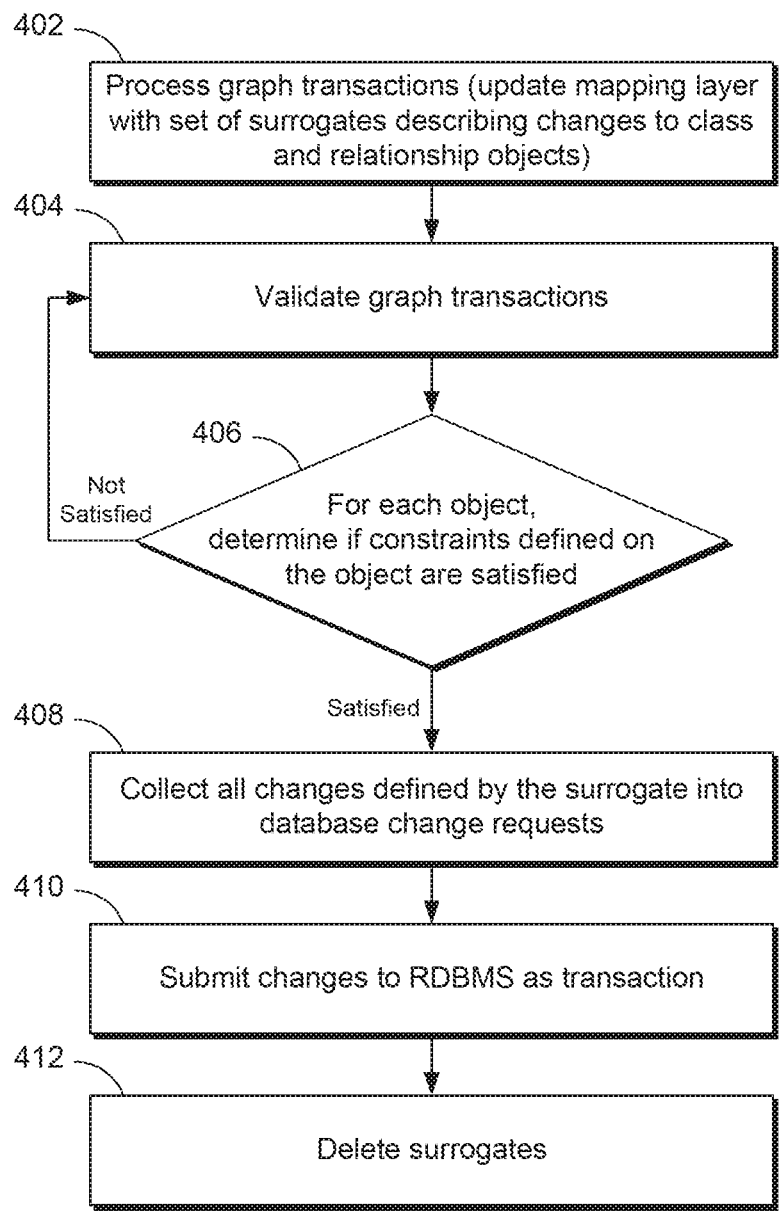
FIG. 4 is a flowchart of mapping a graph database to a relational database.

FIG. 4 is a flowchart of mapping a graph database to a relational database. A graph action to create a vertex may generate a database action to create a new row in a class table associated with a vertex type. A graph action to delete an edge may generate a database action to either remove a row in the database table that corresponds to the relationship or to nullify a foreign key column in a class table.

Accordingly, in examples, it may not be possible to convert a graph transaction immediately into a relational database transaction, as the underlying relational database may have consistency constraints relating to the transaction. For example, an object relating to a person may have required columns in a relational database, so a new person vertex in a graph database cannot be immediately created as a new row in a relational database table. In such examples, changes to a graph database may be cached until the consistency constraints are satisfied by way of creating surrogate objects for each class and relationship in a mapping layer, and deleting the surrogates only after the constraints have been satisfied and the graph transaction committed to the relational database.

Surrogates may be particularly useful in the case where there is a cycle in foreign key references. For example, in the case of three tables, a second table may reference a third table, which in turn may reference a first table. The combination of surrogate objects and caching until database consistency constraints are satisfied through transaction validation may allow for mapping a graph database to a relational database, even in such examples.

In block 402, a graph transaction comprising a sequence of changes to a graph may be processed. The changes may be, for example, adding a vertex, adding an edge, adding a property value to a vertex or an edge, deleting a vertex, deleting an edge, deleting a property value, or modifying a property value. Each vertex, edge, and/or property value may have associated metadata describing its provenance in the underlying relational database, e.g., an underlying table, column, type, derivation, etc.

Block 402 may comprise creating, linking, or updating surrogates. The surrogates may be stored or collected in a mapping layer, e.g., mapping layer 110, which may contain a set of surrogates describing changes to class and relationship objects to apply to the relational database, e.g., RDMBS 102.

For example, if the database change is to add a vertex, if a property-create surrogate exists for the vertex, it may be marked, e.g, as class-create. If no property-create surrogate exists, a new class surrogate corresponding to the vertex type may be created. If a delete surrogate exists, it may be linked to the class-create.

In the database change is to add an edge, in an example, if a property-create surrogate for the relationship exists, it may be marked as relationship-create. If a surrogate does not exist, a new relationship surrogate may be created for the edge with the source vertex identifier as the primary key and the target vertex as the foreign key, and the relationship may be marked as relationship-create. If a delete surrogate exists, it may be linked to the relationship-create surrogate.

If the database change is to add a property, a surrogate may be located for the class or relationship using vertex identifiers, and the property value may be added. If a surrogate does not exist, a new surrogate may be created and marked as property-crate. If a delete surrogate exists fora class or relationship, it may be linked to the new property surrogate.

If the database change is to delete a vertex, if a property-delete surrogate exists, it may be marked as vertex-delete. If the surrogate does not exist, a new class surrogate may be created and marked as, e.g., class-delete. If a class-create or property-create surrogate exists for the vertex identifier, it may be linked to the delete surrogate.

If the database change is to delete an edge, if a property-delete surrogate exists, it may be marked as relationship-delete. If the surrogate does not exist, a new class surrogate may be created and marked as, e.g., relationship-delete. If a class-create or relationship-create surrogate exists for the relationship, it may be linked to the delete surrogate.

If the database change is to delete a property, the surrogate for the class or relationship may be located using, e.g., vertex identifiers. If a surrogate for the property does not exist, a new surrogate may be created and marked as, e.g., property-delete. If an existing create surrogate exists for the class or relationship, it may be inked to the new surrogate.

If the database change is to modify a property, the surrogate for the class or relationship may be located using, e.g., vertex identifiers. If a surrogate for the property does not exist, a new surrogate may be created and marked as, e.g., property-modify. If an existing create surrogate exists for the class or relationship, it may be linked to the new surrogate.

In examples where, for example, a vertex is created, deleted, and then created, a plurality of surrogates for the object may exist. In some examples, the plurality of surrogates may be linked in order of time.

In block 404, the transactions reflected in the mapping layer, e.g., a set of surrogates describing changes to class and relationship objects, may be validated. Transaction validation may comprise determining whether a change may violate a database consistency constraint in the RDBMS. In examples, transaction validation may run independently from a mapping engine, and may be invoked periodically or after processing a graph transaction in block 402.

In block 406, a validation engine may start with the oldest surrogate in the mapping layer and check if constraints defined on the object are satisfied. If the constraints are not satisfied, the transactions should not be submitted to the RDBMS. If the constraints are satisfied, the changes defined by the surrogate may be collected into database change requests in block 408 and submitted or committed to the database, e.g., to a RDBMS, in block 410. In some examples, the surrogates may then be deleted or removed from the mapping layer in block 412.

Figure 5:
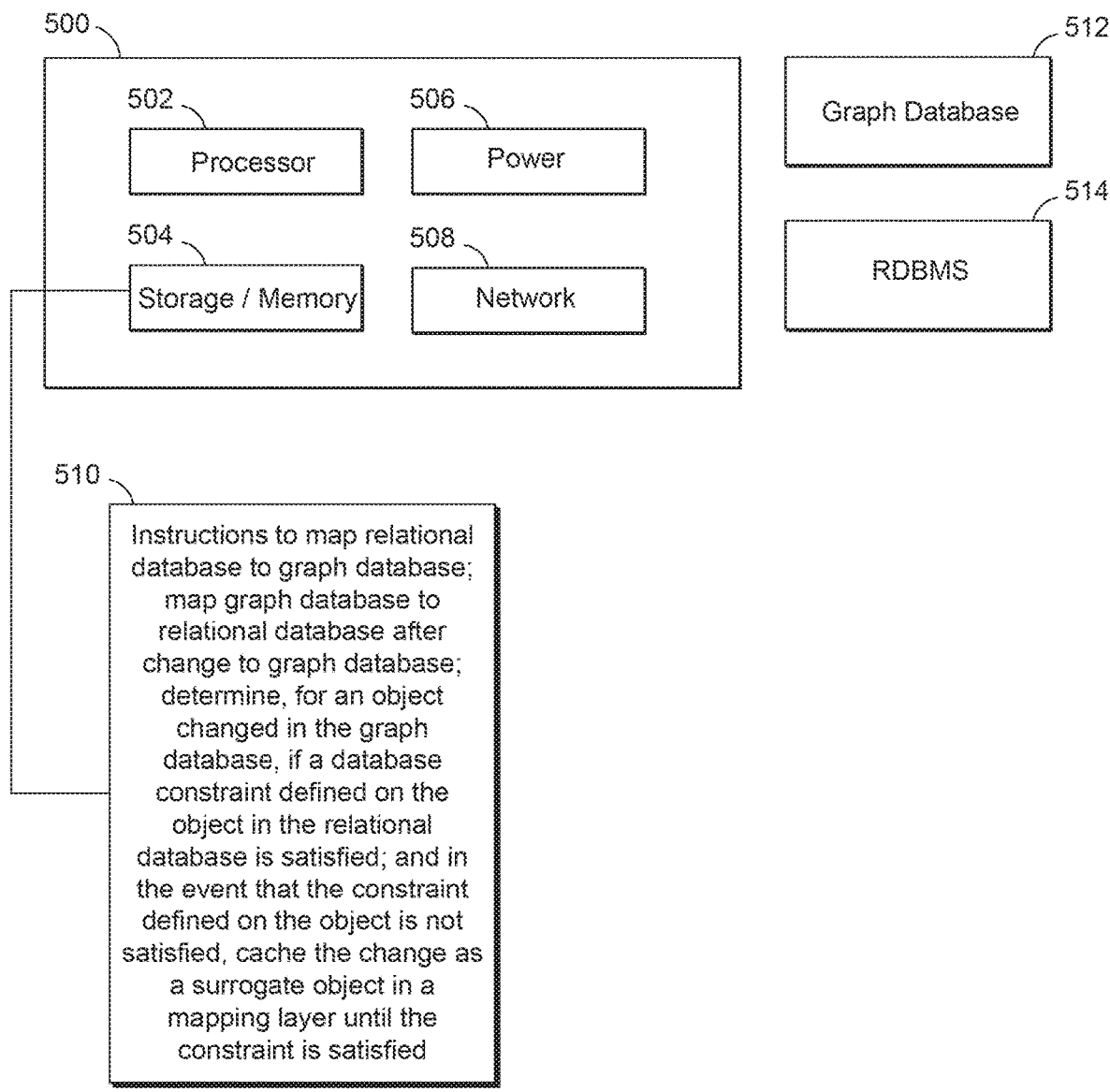
FIG. 5 is a block diagram of a system to map data between a relational database and a graph database, according to an example.

FIG. 5 is a block diagram of a system to map data between a relational database and a graph database, according to an example.

The computing system 500 of FIG. 5 may comprise a processing resource or processor 502. As used herein, a processing resource may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a machine-readable storage medium, or a combination thereof. Processing resource 502 may fetch, decode, and execute instructions, e.g., instructions or engine 510, stored on memory or storage medium 504 to perform the functionalities described herein. In examples, the functionalities of any of the instructions of storage medium 504 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a hard drive, a solid state drive, any type of storage disc or optical disc, and the like, or a combination thereof. Further, any machine-readable storage medium described herein may be non-transitory.

System 500 may also include persistent storage and/or memory. In some examples, persistent storage may be implemented by at least one non-volatile machine-readable storage medium, as described herein, and may be memory utilized by system 500. In some examples, a memory may temporarily store data portions while performing processing operations on them, such as for managing a graph database or mapping between databases.

In examples described herein, a machine-readable storage medium or media is part of an article or article of manufacture. An article or article of manufacture may refer to any manufactured single component or multiple components. The storage medium may be located either in the computing device executing the machine-readable instructions, or remote from but accessible to the computing device (e.g., via a computer network) for execution.

In some examples, instructions or engine 510 may be part of an installation package that, when installed, may be executed by processing resource 502 to implement the functionalities described herein in relation to instructions or engine 510. In such examples, storage medium 504 may be a portable medium or flash drive, or a memory maintained by a server from which the installation package can be downloaded and installed. In other examples, instructions or engine 510 may be part of an application, applications, or component(s) already installed on a computing device including a processing resource, e.g., a computing device running any of the components of graph database environment 100 of FIG. 1.

System 500 may also include a power source 506 and a network interface device 508, as described above, which may receive data such as data from engines 512 and 514, e.g., via direct connection or a network.

As discussed above, the instructions 510 in or on the memory or machine-readable storage of system 500 may comprise an engine. In the engine of block 510, the instructions may map a relational database to a graph database and map the graph database to the relational database after a change to the graph database. A determination may be made, for an object changed in the graph database, whether a database constraint defined on the object in the relational database is satisfied, and in the event that the constraint defined on the object is not satisfied, the change may be cached as a surrogate object in a mapping layer until the constraint is satisfied.

Although the instructions of FIGS. 2-5 show a specific order of performance of certain functionalities, the instructions of FIGS. 2-5 are not limited to that order. For example, the functionalities shown in succession may be performed in a different order, may be executed concurrently or with partial concurrence, or a combination thereof.

All of the features disclosed in this specification, including any accompanying claims, abstract and drawings, and/or all of the elements of any method or process so disclosed, may be combined in any combination, except combinations where at least some of such features and/or elements are mutually exclusive.

What is claimed is:

1. A method for mapping a graph database to a relational database, comprising:
 processing, by a processor of a computing device, a graph transaction of a change in the graph database;
 creating, by the processor, in a mapping layer, a surrogate describing a change to an object in the relational database corresponding to the change in the graph database;
 validating, by the processor, the change to the object described in the surrogate, by determining, with the change to the object, whether a relational-database constraint defined on the object is satisfied; and
 in response to a determination that the relational-database constraint defined on the object is satisfied, writing, by the processor, the change to the object described in the surrogate into a database change request, submitting the database change request to the relational database as a relational-database transaction, and deleting the surrogate in the mapping layer.

2. The method of claim 1, further comprising:
 in response to a determination that the relational-database constraint defined on the object is not satisfied, caching the change to the object in the mapping layer until the relational-database constraint defined on the object is satisfied.

3. The method of claim 1, wherein the surrogate further describes a change to a class of the object.

4. The method of claim 1, wherein the surrogate further describes a change to a relationship of the object.

5. An article comprising at least one non-transitory machine-readable storage medium comprising instructions executable by a processing resource of a graph database system to:
 process a change in a graph database;
 create, in a mapping layer, a surrogate describing a change to an object in a relational database corresponding to the change in the graph database;
 validate the change to the object described in the surrogate, by determining, with the change to the object, whether a relational-database constraint defined on the object is satisfied; and
 in response to a determination that the relational-database constraint defined on the object is not satisfied, cache the change to the object in the mapping layer until the relational-database constraint is satisfied.

6. The article of claim 5, wherein the surrogate describes a change to a class of the object.

7. The article of claim 5, wherein the surrogate describes a change to a relationship of the object.

8. The article of claim 5, wherein the instructions are executable to cause the processing resource to:

create, in addition to the surrogate describing the change in the object, a plurality of surrogates for the object linked in order of time, wherein the plurality of surrogates describe additional changes in the object.

9. The article of claim 8, wherein the plurality of surrogates describes the additional changes to classes and relationships of the object in the relational database.

10. The article of claim 8, wherein the instructions are executable to cause the processing resource to:
validate the additional changes, by determining whether the additional changes violate the relational-database constraint defined on the object.

11. The article of claim 10, wherein, to validate the additional changes, the instructions are executable to cause the processing resource to start the validation with an oldest surrogate in the order of time.

* * * * *